United States Patent
Phelps et al.

(10) Patent No.: US 7,500,094 B2
(45) Date of Patent: Mar. 3, 2009

(54) BIOS IDENTIFICATION, INITIALIZATION AND MANAGEMENT

(75) Inventors: Robert Phelps, Atlanta, GA (US); Sivagar Natarajan, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 488 days.

(21) Appl. No.: 11/252,486

(22) Filed: Oct. 18, 2005

(65) Prior Publication Data

US 2007/0088943 A1   Apr. 19, 2007

(51) Int. Cl.
*G06F 9/00* (2006.01)

(52) U.S. Cl. .................... 713/2; 713/1; 703/21

(58) Field of Classification Search ........... 713/1, 713/2; 395/284; 703/21
See application file for complete search history.

(56) References Cited

U.S. PATENT DOCUMENTS

| | | | |
|---|---|---|---|
| 5,704,035 A | 12/1997 | Shipman | |
| 5,850,562 A | 12/1998 | Crump et al. | |
| 5,854,905 A * | 12/1998 | Garney | 710/104 |
| 6,704,840 B2 | 3/2004 | Nalawadi | |
| 6,763,454 B2 * | 7/2004 | Wilson et al. | 713/1 |
| 6,772,266 B2 | 8/2004 | Nalawadi | |
| 6,785,806 B1 | 8/2004 | Schaefer et al. | |
| 6,848,046 B2 * | 1/2005 | Zimmer | 713/100 |
| 6,986,035 B2 * | 1/2006 | Stevens et al. | 713/2 |
| 7,228,263 B2 * | 6/2007 | Khanna et al. | 703/21 |
| 7,310,724 B2 * | 12/2007 | Chen et al. | 713/1 |
| 2003/0154368 A1 * | 8/2003 | Stevens et al. | 713/1 |
| 2004/0150645 A1 | 8/2004 | Burrell | |
| 2004/0215951 A1 * | 10/2004 | Chen et al. | 713/1 |

* cited by examiner

*Primary Examiner*—Thomas Lee
*Assistant Examiner*—Vincent T Tran
(74) *Attorney, Agent, or Firm*—Hope Baldauff Hartman, LLC

(57) ABSTRACT

The present invention provides systems and methods for a modular and enhanced device initialization manager (eDIM). eDIM enumerates and allocates resources to buses and devices of a computer systems during basic input output system (BIOS) power on self-test (POST).

22 Claims, 7 Drawing Sheets

```
Data structures -
// DEVICE_OBJECT structure definition
typedef struct tDEV_OBJ
{
WORD       wDeviceType; // Device type like bus, IDE, VGA etc.
BYTE       bBusType; // Bus type like PCI, VxB etc.
ADDRESS    tDeviceAddress; // Device address depends on bus type
CLASS_CODE    tClassCode; // Depends on bus type
WORD       wVendorID; // Manufacturer identification number
WORD       wDeviceID; // Device identification number
BYTE bPath[DEVICE_PATH_SIZE]; // ASCII string identifying the
eNode
DEVICE_STATE enDeviceState; // State of the device
WORD       wStatusWord;// Word used to indicate specific
// feature for the eNode
                    // bit 0 - indicates option ROM present
                    // bits 1-15 - reserved
P_RESOURCE     pResList; // List of resources allocated P_IRQ_TBL_ENTRY pIRTTable; // pointer to the IRT for a bridge
BYTE       bIRTLen; // number of entries in the IRT struct tDEV_OBJ *   pParent; // Pointer to the parent DO
struct tDEV_OBJ *   pFirstChild; // Pointer to the first child DO
struct tDEV_OBJ *   pNextSibling; // Pointer to the next siblink
DO
FP_EDRIVER_HDR fpDriver;  // Pointer to the eDriver
} DEVICE_OBJECT, * P_DEVICE_OBJECT;
```

FIG. 4

```
// RESOURCE data structure definition
typedef struct res
{
BYTE  bType;  // Resource type like IO, memory etc
union{
        struct
        {
        BYTE  bConfigRegister; // helps us coordinate which Base
                        //      address register gets programmed
        PHY_ADDR   tLength;
        PHY_ADDR   tAlignment;
        PHY_ADDR   tLowAddress;
        PHY_ADDR   tHighAddress;
        struct res *pNextAllocation; // this pointer is used to point to
                //      the next eNode in the unallocated or allocated list
                //      based on the status of the eNode's allocation
        } PORTS, MEMORY, ROM, ALLOC_ADDR;

struct
        {
        BYTE        bSPIRQ;
        BYTE        bIntNum;
        WORD        tBMP;
        struct res *pNextIRQ;
        } INTERRUPT, IRQ;

struct
        {
        DWORD                   dwLowChannel;
        DWORD                   dwHighChannel;
        } DMA;

struct
        {
        DWORD                   dwLength;
        DWORD                   dwLowBusNumber;
        DWORD                   dwHighBusNumber;
        } BUSNUMBER;
        } u;
struct res              *pNextResource;
struct tDEV_OBJ         *pDevice; // pointer to device that owns the resource
} RESOURCE, *P_RESOURCE;
```

FIG. 7

BIOS IDENTIFICATION, INITIALIZATION AND MANAGEMENT

TECHNICAL FIELD

The present invention relates generally to methods of programming electrical computers and data processing systems, and more specifically to a BIOS (Basic Input/Output System) method, apparatus and system for device identification, initialization and management in said systems.

BACKGROUND OF THE INVENTION

When computers are initially turned on or reset, they typically go through a "booting" process. When a computer "boots" a built-in diagnostic program known as a power-on self-test (POST) is performed wherein various tests are run to confirm core components of the computer system are present and functioning properly and wherein the registers within certain hardware devices are initialized. Part of performing the POST involves loading the basic input and output system (BIOS) code into memory. A computer system requires BIOS to control the basic hardware operations, such as interactions with disk drives, hard drives, the keyboard, and other peripheral devices. After performing the POST, the computer typically loads an operating system (OS).

More specifically, the BIOS is a collection of instructions known as firmware routines typically hardwired into a read-only-memory (ROM) device of a computer, and used by a processor of a computer to identify, initialize, allocate and manage other system hardware. The BIOS is the lowest-level software in the computer system acting as an interface between the hardware (especially the processor) and higher level programs such as the OS. By providing a set of low-level routines the BIOS enables the OS to interface with different hardware devices while in operation, thus facilitating the operation of various software applications. The BIOS is also responsible for allowing control of a computer's hardware settings, for booting up the computer when the power is turned on or when the reset button is activated, and various other system functions.

However, in view of the present invention, the prior art BIOS is deficient in many ways. More specifically, the prior art BIOS implementation consists of a lengthy series of undivided code unable to perform discrete functions or tasks. Additionally, the prior art BIOS consists of undivided code unable to perform any subset of functions specific to a particular hardware. If a programmer wishes to amend the prior art BIOS to add or delete an existing feature or function, or to add or delete hardware, the programmer must search the entire code line-by-line to locate the appropriate code section or sections within the BIOS, thus resulting in an inefficient and time consuming task.

In addition, the prior art BIOS implementation is unable to cope with the growing complexity and requirements of new computer platforms, components, features, processors, peripherals, applications and/or operating systems. More specifically, complete re-writing of the BIOS code is required for compatibility with new platforms, such as going from Intel Architecture IA32 to IA64.

Furthermore, the prior art BIOS implementation for resource allocation for devices is set to allocate 2× the resource requirement for a device resulting in over allocation and waste of system resources for each device within the computer system.

Therefore, it is readily apparent that there is a need for a new BIOS method that is modular in design allowing for a simplified process for the removal or addition of support for new computer platforms, components, features, processors, peripherals, applications, operating systems and/or avoiding over allocation of system resources.

BRIEF SUMMARY OF THE INVENTION

Briefly described, in the preferred embodiment, the present invention overcomes the above-mentioned disadvantages and meets the recognized need for such a process by providing a new modular firmware solution of BIOS code.

According to its major aspects and broadly stated, the present invention in its preferred embodiment is an Enhanced Device Initialization Manager (eDIM). More specifically, eDIM in its preferred form is a modular system of POST BIOS code that simplifies and quickens the process for the removal or addition of support for new computer platforms, components, features, processors, peripherals, applications, operating systems and/or avoiding over allocation of system resources. Modularity eliminates the need for a programmer to rewrite and debug code line-by-line when supporting new and evolving architectures including new devices and features as well as down scaling the BIOS code for a specific computer system.

Since eDIM is modular in design and consists of isolated code sections that perform specific functions and/or further consists of subroutines that support specific hardware devices, a programmer may amend individual code sections or subroutines without having to search the entire BIOS code line-by-line for applicable code. Thus, because eDIM is modular, it allows a programmer to quickly remove or add support for new computer platforms, components, features, processors, peripherals, applications and/or operating systems by accessing, editing, adding and/or deleting the specific BIOS code section or subroutine that pertains to a particular device, technology, feature and/or function.

eDIM performs several functions in its preferred embodiment consisting of but not limited to the following steps. eDIM facilitates bus and device enumeration, and device resource allocation during POST. eDIM finds, unpacks, and creates a driver list for all drivers; eDIM initializes both the configuration manager and the resource manager; eDIM allocates the root node and searches the driver list for the root node driver; eDIM prepares to enumerate the root node and enumerates the root node and all buses and devices systematically stemming from the root node, each an eNode; and eDIM allocates resources for the root node and all buses and devices stemming from the root node by allocating correct memory and I/O space resource requirement for such devices.

Accordingly, a feature and advantage of the present invention is its ability to provide support for IA64 and IA32 platform architectures and 64 bit addressing and its ability to evolve with future architectures.

Another feature and advantage of the present invention is its ability to provide support for full BIOS modularity and scalability solution, thereby facilitating the removal or addition of support for a particular bus or device.

Still another feature and advantage of the present invention is its ability to provide a modular solution, thereby allowing customization and specialization of the BIOS code for a specific computer system.

Yet another feature and advantage of the present invention is its ability to provide support for legacy free and legacy platform architecture, including extended industry standard architecture (EISA), industry standard architecture (ISA) and plug-n-play industry standard (PnPISA).

Yet another feature and advantage of the present invention is its ability to provide support for efficient resource management and manual resource configuration.

Yet another feature and advantage of the present invention is its ability to provide support for pre-configured or closed platform configured systems.

Yet another feature and advantage of the present invention is its ability to provide support for bridge hopping.

Yet another feature and advantage of the present invention is its ability to provide support for docking hotplug PCI.

Yet another feature and advantage of the present invention is its ability to provide support to handle option ROMs efficiently.

Yet another feature and advantage of the present invention is its ability to provide support for separate north and south bridge code.

Still yet another feature and advantage of the present invention is its ability to provide support for resource and error logging for debugging purposes.

These and other features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which:

FIG. 4 is BIOS code for a device object structure according to the preferred embodiment of the present invention.

FIG. 7 is BIOS code for a resource data structure according of the preferred embodiment of the present invention.

DETAILED DESCRIPTION OF THE PREFERRED AND ALTERNATIVE EMBODIMENTS

Figure 1:
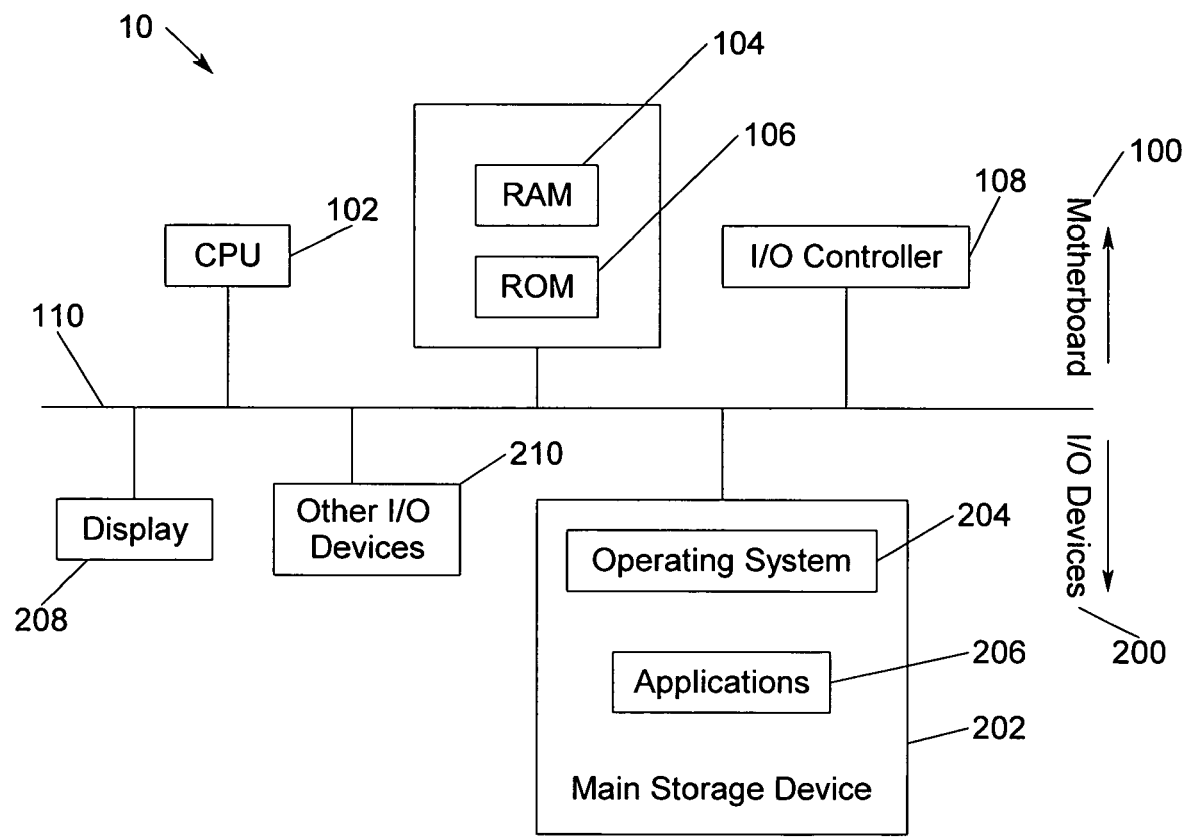
FIG. 1 is a block diagram of a computer system environment for embodiments of the present invention.

In describing the preferred and alternate embodiments of the present invention, as illustrated in FIGS. 1-7, specific terminology is employed for the sake of clarity. The invention, however, is not intended to be limited to the specific terminology so selected, and it is to be understood that each specific element includes all technical equivalents that operate in a similar manner to accomplish similar functions.

As will be appreciated by one of skill in the art, the present invention may be embodied as a method, data processing system, or computer program product. Accordingly, the present invention may take the form of an entirely hardware embodiment, entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, ROM, RAM, CD-ROMs, optical storage devices, or magnetic storage devices.

The present invention is described below with reference to flowchart illustrations of methods, apparatus (systems) and computer program products according to embodiments of the invention. It will be understood that each block or step of the flowchart illustrations, and combinations of blocks or steps in the flowchart illustrations, can be implemented by computer program instructions. These computer program instructions may be loaded onto a general purpose computer, special purpose computer, or other programmable data processing apparatus to produce a machine, such that the instructions which execute on the computer or other programmable data processing apparatus create devices and/or means for implementing the functions specified in the flowchart block or blocks/step or steps.

These computer program instructions may also be stored in a computer-usable memory that can direct a computer or other programmable data processing apparatus to function in a particular manner, such that the instructions stored in the computer-useable memory produce an article of manufacture including instruction means which implement the function specified in the flowchart block or blocks/step or steps. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks/step or steps.

Accordingly, blocks or steps of the flowchart illustrations support combinations of means for performing the specified functions, combinations of steps for performing the specified functions and program instruction means for performing the specified functions. It will also be understood that each block or step of the flowchart illustrations, and combinations of blocks or steps in the flowchart illustrations, can be implemented by special purpose hardware-based computer systems which perform the specified functions or steps, or combinations of special purpose hardware and computer instructions.

Computer programs for implementing the present invention may be written in various programs, including, but not limited to object-oriented programming languages, such as conventional C calling. However, it is understood that other source and/or object oriented programming languages, and other conventional programming languages could be utilized without departing from the spirit and intent of the present invention.

Referring now to FIGS. 1-7, the present invention in its preferred embodiment is a BIOS solution for device identification, initialization and management during POST, wherein the process for the removal or addition of support for new computer platforms, components, features, processors, peripherals, applications and/or operating systems is simplified and made more efficient.

Referring now to FIG. 1, there is illustrated a block diagram of a computer system 10 that provides a suitable environment for implementing embodiments of the present invention. The computer architecture shown in FIG. 1 is divided into two groups motherboard 100 and input/output (I/O) devices 200. Motherboard 100 includes bus 110 which interconnects major subsystems such as central processor (CPU)

102, random access memory (RAM) 104, input/output (I/O) controller 108, and read-only memory (ROM) 106, also known as firmware.

A BIOS containing the basic routines that help to transfer information between elements within computer system 10, such as during startup, including POST, is stored in the ROM 106 or operably disposed in RAM 104. Computer system 10 further includes display 208, for visual output and I/O devices such as main storage device 202, for storing operating system 204, and application programs 206. The main storage device 202 is connected to the CPU 102 through a main storage controller connected to bus 110.

Many other devices or subsystems 210 may be connected in a similar manner such as keyboard, pointing device (e.g., a mouse), floppy disk drive, CD-ROM player, printer and modem each connected via an I/O adapter.

It is not necessary for all of the devices shown in FIG. 1 to be present to practice the present invention, as discussed below. Furthermore, the devices and subsystems may be interconnected in different ways from that shown in FIG. 1. The operation of a computer system such as that shown in FIG. 1 is readily known in the art and is not discussed in detail in this application, so as not to overcomplicate the present discussion.

Figure 2:
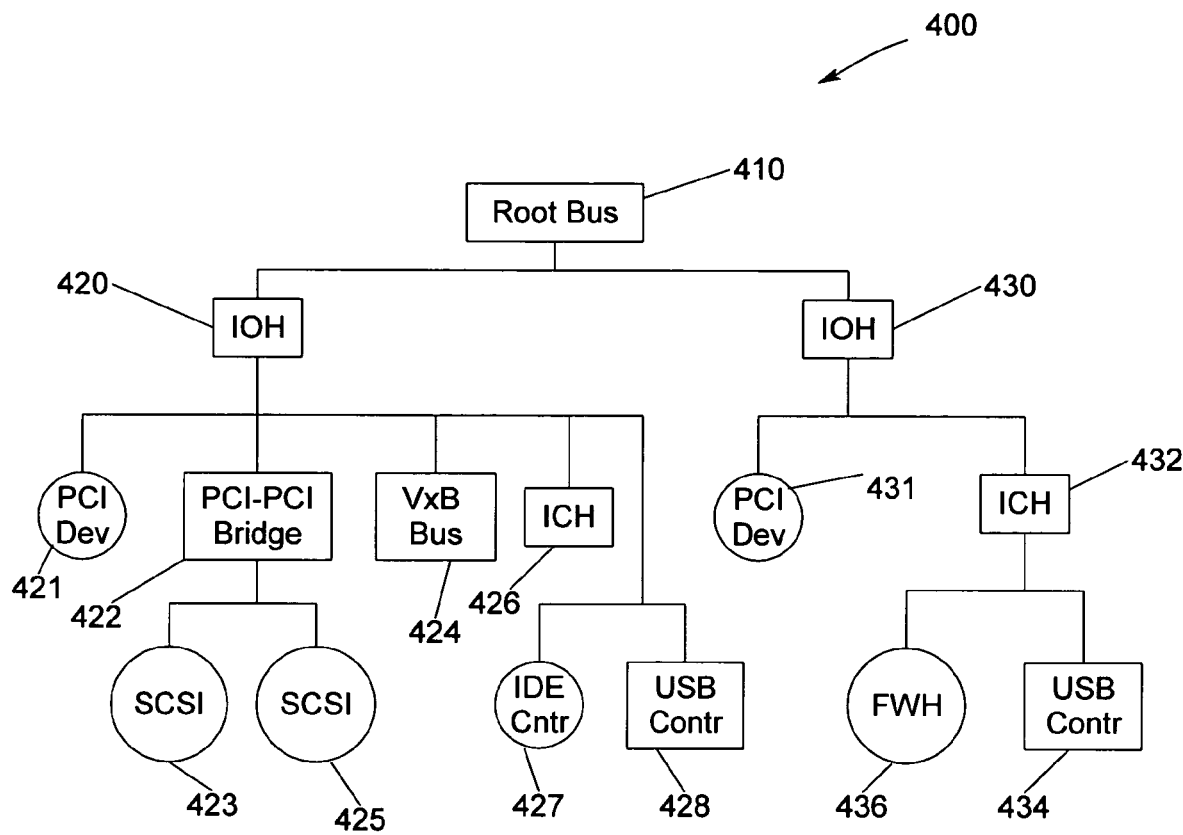
FIG. 2 is a block diagram of a sample bus and device configuration for a computer system of FIG. 1.

Referring now to FIG. 2, there is illustrated a block diagram of a sample bus and device configuration 400 for a computer system, where objects represented by rectangles are buses and objects represented by circles are devices connected to the buses. FIG. 2 begins with a root bus 410 coupled to two input/output hubs (IOH), IOH 420 and IOH 430, respectively. IOH 420 is coupled to PCI device 421, PCI-PCI bridge bus 422, virtual extended bus (VxB) 424, input/output controller hub (ICH) 426, integrated drive electronics (IDE) controller 427 and universal serial bus (USB) controller 428. PCI-PCI bridge bus 422 is further coupled to two small computer system interface (SCSI) devices 423 and 425, respectively. IOH 430 is coupled to PCI device 431, ICH 432, firmware hub (FWH) 436 and USB controller 434.

Figure 3:
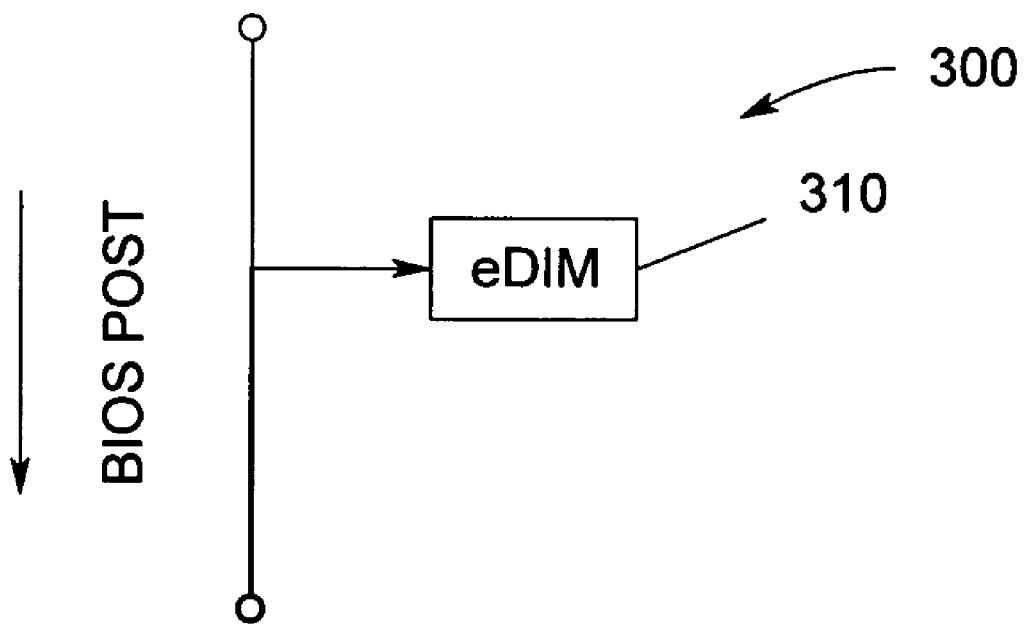
FIG. 3 is an operational flow of BIOS POST according to the preferred embodiment of the present invention.

Referring now to FIG. 3, a flow diagram is shown that illustrates a preferred step in a process 300 for BIOS POST. The BIOS POST operational flow preferably consists of step eDIM (step 310). In step 310, of process 300, POST passes control to eDIM 310 after performing the necessary initialization to enable eDIM 310 to see root bus 410 and its subsystems of buses and devices. Next, eDIM 310 preferably enumerates the busses, identifies busses and devices and allocates resources to the bus and devices preferably using device and bus specific instructions called eDrivers. eDIM 310 preferably builds a device tree for the system which will be later utilized by other components in computer system 10 and by additional steps in BIOS POST. Thereafter, eDIM 310 preferably hands control back to POST.

In step 310, of process 300, the bus and device architecture are preferably constructed as a tree type architecture as shown in FIG. 2. An eNode preferably is a generic term for a data structure of i) a bus device, which can spawn additional buses and or devices or ii) an end device, which typically does not spawn additional devices. Root bus 410, IOH 420, IOH 430 and their respective children (subsystem of buses and or devices coupled to the bus one level up in the tree architecture) including each end device may be termed as an eNode. For example, root bus 410 is the root bus eNode. This eNode preferably includes IOH 420 and IOH 430 and their respective children. Bus IOH 420 is an eNode and includes end device PCI Dev 421, bus PCI-PCI Bridge 422 and its respective children, VxB Bus 424, bus ICH 426, integrated drive electronics (IDE) controller 427 and universal serial bus (USB) controller 428. This generic terminology naming scheme continues up and down the tree type architecture. Each eNode that is present in the device tree preferably has been created by eDrivers. Each eDriver has a specific number of entry points including find driver, prepare enumeration, enumerate, allocate resources, and route interrupt preferably with specialized instructions related to the eNode. eDrivers are preferably subsets of code, with predefined entry points, that identify, enumerate and configure a specific type of eNode. eDrivers have common entry points in preferably C-calling convention. eDIM 310 preferably supports two types of eDrivers: bus eDrivers and device eDrivers.

Figure 6:
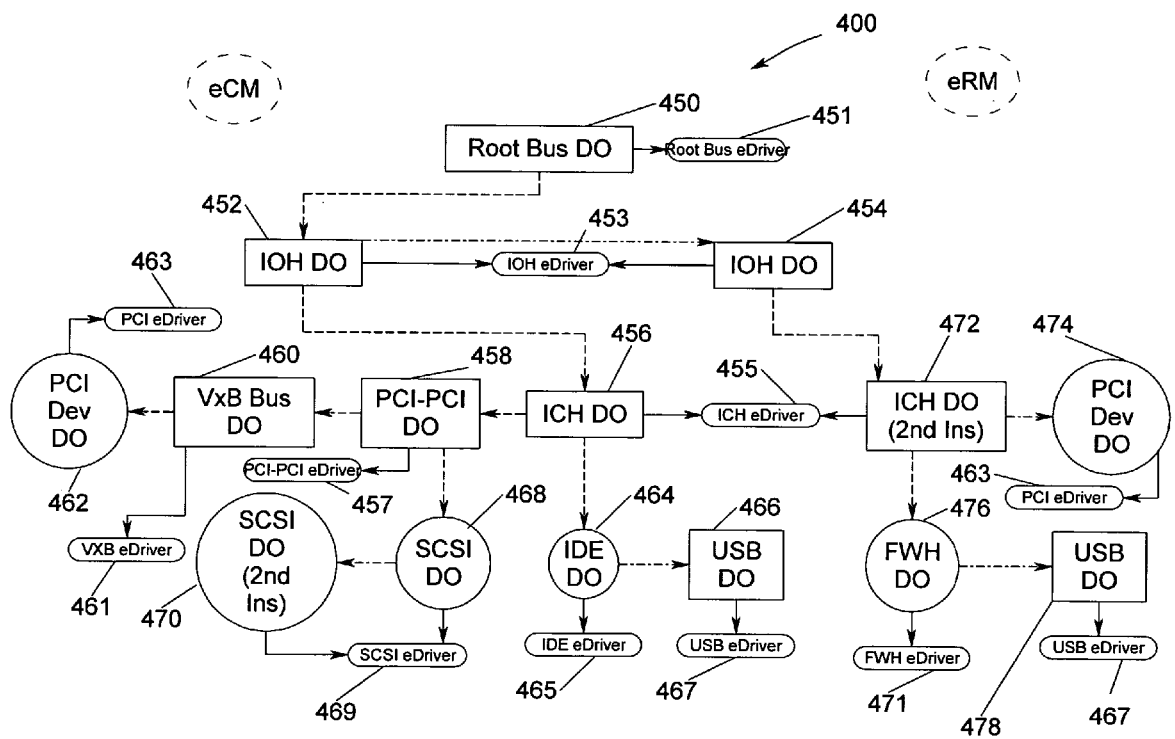
FIG. 6 is a block diagram of a sample bus and device configuration of FIG. 2 including device object, drivers and pointers according to the preferred embodiment of the present invention.

Each eDriver preferably creates a data structure called a device object (DO), which is associated with an eNode, see FIG. 6. The DO typically contains information about the eNode such as vendor id, product id, hardware revision level, bus function, link information to form the tree type architecture, and resource requirements. The type of information stored in the DO will depend on the bus and device type. eDrivers with specialized instructions in the common entry points preferably identify, enumerate and configure eNodes for the eDIM 310. With the use of common entry points, eDrivers preferably hide the complexity and nature of the eNode. Referring now to FIG. 4, there is disclosed a DO structure definition according to the preferred embodiment of the present invention.

Figure 5:
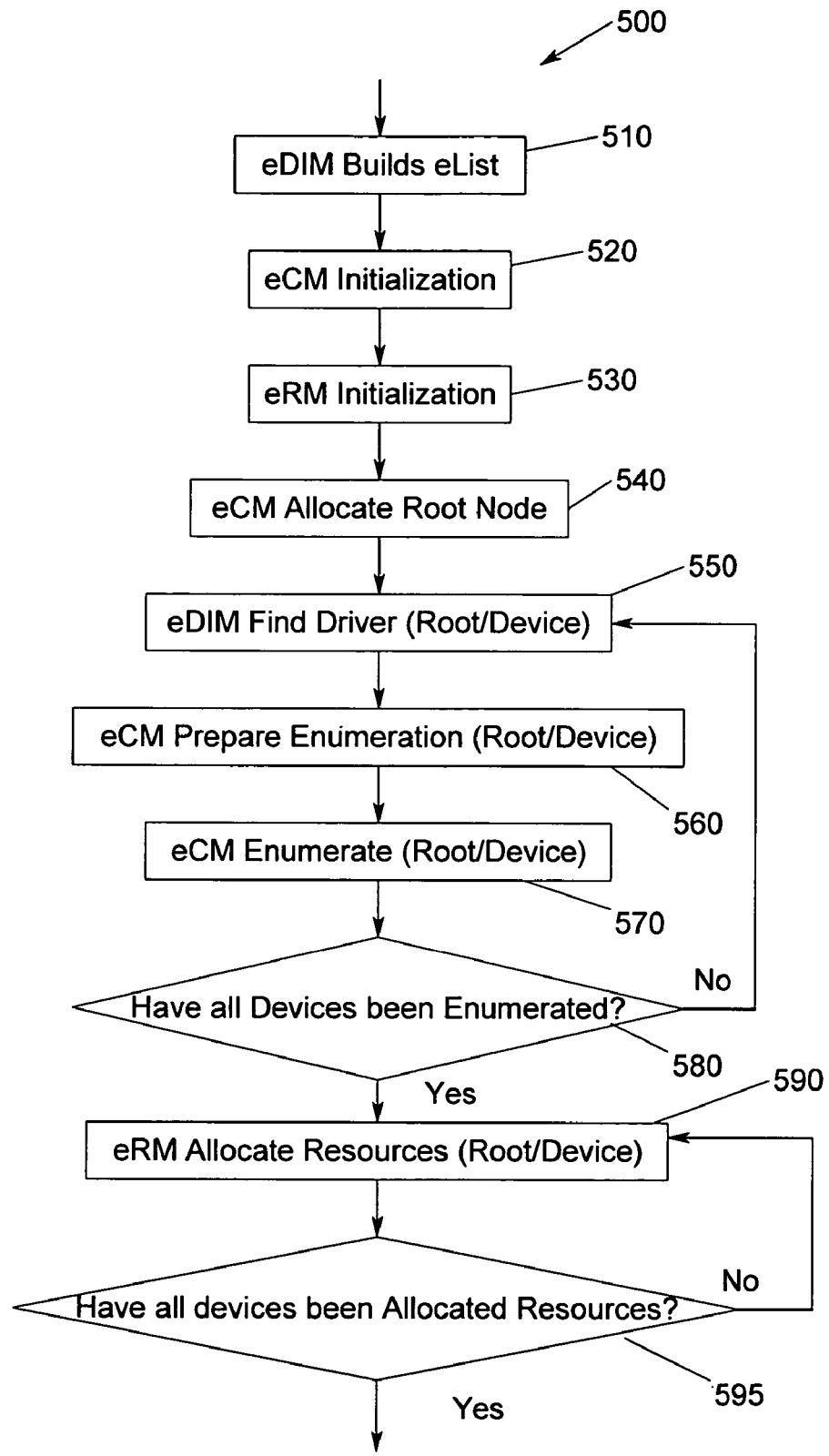
FIG. 5 is an operational flow of eDIM according to the preferred embodiment of the present invention.

Referring now to FIG. 5, there is shown an operational flow, which illustrates process 500 of eDIM 310 flow according to a preferred embodiment of the present invention. In step 510, of process 500, eDIM 310 finds and unpacks all eDrivers found in the system firmware. eDIM 310 classifies each device into one of three types: 1) Device/Bus Specific (these eDrivers are written specifically for a particular device or bus wherein vendor id, product id and hardware revision level matches the specific device or bus; if an eDriver accesses proprietary registers then it is typically classified as a Device/Bus Specific eDrivers); 2) Class Specific (these eDrivers have the capability of controlling a class of devices requiring predefined resources such as intelligent device driver (IDE) or video graphics array (VGA)); and 3)Generic (these eDrivers are capable of controlling any device belonging to a particular bus; for example a generic PCI bus driver can handle resource needs for all PCI devices connected to the PCI bus).

Next, eDIM 310 builds a Table of pointers to eDrivers (termed eList) preferably by scanning all the available eDriver storage devices.

TABLE 1 eDriver Characteristics Table

| Driver | Type | Matching condition | Physical Name |
|---|---|---|---|
| Bus eDriver | Generic | Bus Type = 0 (ROOT) | Chipset Root 410 |
| Bus eDriver | Device/Bus Specific | VID, PID & H/W rev | IOH (1 & 2); 420 & 430 |
| Bus eDriver | Class Specific | Class Code = PCI—PCI Bridge | P2PB 422 |
| Device eDriver | Generic | Bus Type = PCI | VxB 424 |
| Device eDriver | Generic | Bus Type = PCI | PCI Dev (1 & 2); 421 & 431 |
| Bus eDriver | Device/Bus Specific | VID, PID & H/W rev | ICH (1 & 2); 426 & 432 |
| Device eDriver | Generic | Bus Type = PCI | SCSI (1 & 2); 423 & 425 |
| Device eDriver | Generic | Bus Type = PCI | USBC (1 & 2); 428 & 434 |
| Device | Class | Class Code = IDE | IDE 427 |

TABLE 1-continued eDriver Characteristics Table

| Driver | Type | Matching condition | Physical Name |
|---|---|---|---|
| eDriver Device eDriver | Specific Class Specific | Class Code = FWH | FWH 433 |

Table 1 is an example of the Driver Characteristics Table, which defines the types and characteristics of each eDriver, for the sample bus and device configuration for the computer system set forth in FIG. 2 and the type classifications for each bus and device. eList is preferably a dynamically created list of eDrivers, which eDIM 310 uses to search and locate the appropriate eDriver for a particular bus or device being enumerated by eDIM 310.

In step 520, of process 500, eDIM 310 calls Configuration Manager (eCM) and initializes the configuration manager by calling eCM initialization call. eCM provides generic instructions that enable eDIM to enumerate and allocate the device tree. These functions contain code that would have to be repeated in every eNode driver in the system thus allowing for smaller more manageable eNode code. Moreover, a system developer can create drivers quicker and more efficiently by using library functions provided by eCM.

In step 530, of process 500, eDIM 310 calls Resource Manager (eRM) and initializes resource manager by calling eRM initialization call. eRM preferably manages the system-wide resources for eDIM 310 including memory, I/O space, list of interrupts, global address space, pointers to addresses where instructions are located and any other resources that can be allocated to the bus or device being enumerated. The bus is also included as a resource that eRM manages. eRM manages the arbitration and allocation of resources to the buses and devices of the system. Preferably, eDrivers will not allocate resources to their children but instead will call eRM to allocate the resources to their children.

In Step 540 of process 500 eDIM 310 calls eCM to create a starting point for the enumeration of computer system 10 termed Root Bus eNode 410, a virtual representation of the starting point in the system. Computer system 10 may have multiple Root Buses or it may have a single Root Bus often termed the system bus, such as bus 110 in FIG. 1. See FIG. 2 as an example of a computer system where Root Bus 410 is the only Root eNode. eDIM 310 preferably allocates a DO for the Root Bus using eCM and fills the Root Bus eNode device object.

In Step 550, of process 500, eDIM 310 preferably calls eCM to search the eList to find the appropriate eDriver by searching for the driver for bus number zero. eCM calls all the eDrivers to report the Confidence Level by passing the eDrivers the DO of the eNode. eCM calls each eDriver in the eList to report its support Confidence Level rated from 0 to 3. Here, 0 preferably meaning no confidence, 1 preferably meaning very little confidence (such as Generic eDriver), 2 preferably meaning little confidence (such as Class Specific eDriver) and 3 preferably meaning full confidence (such as Device/Bus Specific eDriver with vendor id, product id and hardware revision level matching). Bus eDrivers have special knowledge about the bus and how to enumerate devices on the bus.

In Step 560, of process 500, eDIM 310 preferably calls eCM to prepare enumeration entry point in root bus 410 eDriver. This call prepares root bus 410 chipset registers for enumeration and updates the eNode DO data structure. This call is used to disable the device referenced by the device object passed and initialize its state in such a way that it won't affect the enumeration process. For example, for PCI2PCI eDriver 457 this call will preferably set up the device data structure and program the bus number to 0xFF. If eCM is unable to disable the device, eCM will return a failure condition which preferably is remedied by the parent eDriver. Otherwise, eCM returns a success code.

In Step 570, of process 500, eDIM 310 preferably calls eCM to enumerate root bus 410. Since root bus 410 is a bus eDriver, eCM reports its resource requirement and recursively enumerates and updates resource requirements of root bus 410 and its eNodes. This call creates the eNodes DO that represent the child devices in the root bus. The example in FIG. 2 has two children represented by IOH 420 and IOH 430. Root bus eDriver 451 fills in the DO for each eNode such as bus type, device type, device address, vendor id, and device id. Additional information may be stored in the DO depending on the type of device, whether Device/Bus Specific or Class Specific. Next, eDIM_FindDriver( ) is called to find the best driver for each physical head. Bus eDrivers have special knowledge about the bus and how to enumerate devices on the bus. This call is preferably used recursively to enumerate each eNode created by the root bus eDriver 451 consisting of busses and devices. eDIM 310 preferably assumes that no bus eDriver needs resources to enumerate its child devices and it is preferably the eDrivers' responsibility to create DO for each child device it enumerates. eCM uses the Confidence Level value with the device version information to select and load the best eDriver for an eNode, which is the eDriver that reports the highest Confidence Level and the latest version of driver for that eNode. If two eDrivers report the same Confidence Level and different device version numbers then the eDriver with the higher version number will be loaded. eDIM supports overriding of eDrivers to support non-compliant devices and/or to support special multi-functional eDrivers. The resource requirement of the eDriver can only be finalized after enumerating all the child buses.

For example referring to FIG. 2, FIG. 5 and FIG. 6, in step 550, eDIM calls eCM, wherein eCM preferably searches eList to find the root bus eDriver 451 by searching for the driver for bus number zero. In step 560, eCM preferably calls the PrepareEnumeration entry point in the root bus 410 and updates the root bus 410 DO data structure 450. In step 570, eCM enumerates the root bus 410 by loading root bus eDriver 451. If all the busses and devices connected to root bus 410 have been enumerated, then eDIM 310 passes control to eRM. Otherwise, eCM recursively searches for all devices and buses beginning one level down from root bus 410 and consolidates the resource requirements of its children and allocates an eNode for each branch. eCM searches root bus 410 eNode for devices or buses connected to root bus 450 and finds buses IOH 420 and IOH 430. Next, in step 550, eCM preferably searches eList to find the best eDriver for IOH 420. In step 560, eCM preferably calls the PrepareEnumeration entry point for IOH 420 and updates the IOH DO 452 data structure. In step 570, eCM preferably enumerates IOH 420 by loading IOH eDriver 453. Next, IOH eDriver 453 searches IOH 420 eNode for devices or buses connected to IOH 420 and finds the following eNodes: an input/output controller hub (ICH) 426, PCI-PCI bridge bus 422, a virtual extended bus (VxB) 424, PCI device 421, integrated drive electronics (IDE) controller 427 and universal serial bus (USB) controller 428. eCM preferably will recursively enumerate these nodes one level down from eNode IOH 420.

Beginning in step 550, eCM preferably searches eList to find the best eDriver for ICH 426. In step 560, eCM calls the PrepareEnumeration entry point for ICH 426 and updates ICH DO 456 data structure with device specific information. In step 570, eCM preferably enumerates ICH 426 by loading ICH eDriver 455. Next, in step 550, eCM searches eList to find the best eDriver for PCI-PCI bridge bus 422. This device can request resources but typically does not request resources; however, PCI-PCI bridges belonging to PCI express ports request resources. In step 560, eCM calls the PrepareEnumeration entry point for PCI-PCI bridge bus 422 and updates PCI-PCI DO 458 data structure with device specific information. In step 570, eCM preferably enumerates PCI-PCI bridge bus 422 by loading PCI-PCI eDriver 457. Next, in step 550, eCM preferably searches eList to find the best eDriver for VxB bus 424. This device VxB bus 424 is an example of bridge hopping, a bridge from the PCI bus 422 to VxB bus 424. In step 560, eCM calls the PrepareEnumeration entry point for VxB bus 424 and updates VxB bus DO 460 data structure with device specific information. VxB bus eDriver 461 enables VxB bus 424 which is preferably capable of allocating resources across the two bus architectures. In step 570, eCM preferably enumerates VxB bus 424 by loading VxB eDriver 461. Next, in step 550, eCM preferably searches eList to find the best eDriver for bus PCI device 421. This device preferably has no children, just resource requests. In step 560, eCM preferably calls the PrepareEnumeration entry point for PCI device 421 and updates PCI device DO 462 data structure with device specific information. In step 570, eCM enumerates PCI device 421 by loading PCI eDriver 463. PCI eDriver 463 searches PCI device DO 462 for resource requests and option ROM. If a resource is found then an eNode of type resource is allocated and along with the resource information is attached to PCI device 421 resource lists. Next in step 550, eCM preferably searches eList to find the best eDriver for IDE controller 427. In step 560 eCM calls the PrepareEnumeration entry point for IDE controller 427 and updates IDE DO 464 data structure. In step 570, eCM enumerates IDE controller 427 by loading IDE eDriver 465. Next, in step 550, eCM searches eList to find the best eDriver for USB controller 428. In step 560, eCM calls the PrepareEnumeration entry point for USB controller 428 and updates USB DO 466 data structure. In step 570, eCM enumerates USB controller 428 by loading USB eDriver 467. Next, eCM searches eNode PCI-PCI bridge bus 422 for devices or buses coupled to PCI-PCI bridge bus 422 and finds the following eNodes: small computer system interface (SCSI) devices 425 and 423.

Beginning in step 550, eCM preferably searches eList to find the best eDriver for SCSI device 425. In step 560, eCM preferably calls the PrepareEnumeration entry point for SCSI device 425 and updates SCSI DO 470 data structure with device specific information. In step 570, eCM preferably enumerates SCSI device 423 by loading SCSI eDriver 469. SCSI eDriver 469 searches SCSI DO 470 for resource requests and option ROM. If a resource is found, then an eNode of type RESOURCE is allocated and along with the resource information is attached to SCSI device 425 resource list. Next, in step 550, eCM preferably searches eList to find the best eDriver for SCSI device 423. In step 560, eCM calls the PrepareEnumeration entry point for SCSI device 423 and updates SCSI DO 468 data structure. In step 570, eCM preferably enumerates SCSI device 423 by loading SCSI eDriver 469. SCSI eDriver 469 searches SCSI DO 468 for resource requests and option ROM. If a resource is found then an eNode of type RESOURCE is allocated and along with the resource information is attached to SCSI device 423 resource list. eCM has completed the enumeration of this branch eNode IOH 420.

SCSI device 423 and SCSI device 425 pass its resource (memory and I/O space) requirements to eNode PCI-PCI bridge bus 422. PCI-PCI bridge bus 422, VxB bus 424, PCI device 421, ICH 426 eNode, IDE controller 427, USB controller 428 pass their resource requirements to eNode IOH 420. Next eCM begins the enumeration of branch eNode IOH 430.

Next, in step 550, eCM preferably searches eList to find the best eDriver for IOH 430. In step 560, eCM preferably calls the PrepareEnumeration entry point for IOH 430 and updates the IOH DO 454 data structure. In step 570, eCM preferably enumerates IOH 430 by loading IOH eDriver 453. Next, eCM preferably searches IOH 430 eNode for devices or buses connected to IOH 430 and finds the following eNodes: PCI device 431, ICH 432, firmware hub (FWH) 436 and USB controller 434. eCM preferably will recursively enumerate these nodes one level down from eNode IOH 430.

Beginning in step 550, eCM preferably searches eList to find the best eDriver for ICH 432. In step 560, eCM preferably calls the PrepareEnumeration entry point for ICH 432 and updates ICH DO 472 data structure. In step 570, eCM preferably enumerates ICH 432 by loading ICH eDriver 455. Next, in step 550, eCM searches eList to find the best eDriver for bus PCI device 431. In step 560, eCM calls the PrepareEnumeration entry point for PCI device 431 and updates PCI device DO 474 data structure. In step 570, eCM preferably enumerates PCI device 431 by loading PCI eDriver 463. Next, in step 550, eCM searches eList to find the best eDriver for FWH 436. In step 560, eCM preferably calls the PrepareEnumeration entry point for FWH 436 and updates FWH DO 476 data structure. In step 570, eCM preferably enumerates FWH 436 by loading FWH eDriver 471. Next, in step 550, eCM preferably searches eList to find the best eDriver for USB controller 434. In step 560, eCM preferably calls the PrepareEnumeration entry point for USB controller 434 and updates USB DO 478 data structure. In step 570, eCM preferably enumerates USB controller 434 by loading USB eDriver 467.

USB controller 434, FWH 432, ICH 436 and PCI device 431 pass their resource requirements to eNode IOH 430. eNode IOH 420 and eNode IOH 430 pass their resource requirements to eNode Root Bus 410. Thereafter, eNode root bus 410 and its eDriver have a filled in data structure and resource requirements for the entire Root Bus eNode. eCM exits enumeration for Root Bus and passes control back to eDIM.

Step 570 preferably performs the following tasks:
1. Form eNode for all its children
2. Call eCM to load eDrivers for its children by providing list of all its children
3. Call eCM to disable all its children by providing a list of its children
4. For each child (Step 580) preferably:
   a) Enable the child for enumeration by setting proper registers
   b) Call Enumerate routine for the child
   c) Determine the resources for the child
5. Update eNode with resource requirement. Resource requirement for a bus is a cumulative value of the resources of its children
6. Return call When control returns from this call the whole eNode tree for the system will be built as shown in FIG. 5, wherein the DO, eDriver and communication pipes for each device in the computer system of FIG. 2 is enumerated.

In step 590 of process 500, eDIM 310 preferably calls eRM to allocate resources (memory and I/O space) to the root bus 410 based on resource requirements collected from each eNode in the Root Bus during the enumeration process in step 570. The parent eDriver of the current eNode will recursively invoke this allocation of resources routine for each eNode. When memory for each eNode has been allocated, the AllocateResource( ) function is called for each eNode. AllocateResource( ) function programs the eNode base address and limit registers defining resource commands that eNode will respond to and/or forward onto its children. AllocateResource( ) function programs the eNode configuration space giving the eNode instructions on the resources the eNode is allowed to use. The parent eDriver provides the resource requirement to be used by the eNode. If the eNode is a bus eDriver, then it re-allocates the resources to its children. For the Root Bus eDriver the parent eDriver is eCM. eRM allocates the resources for the eNode and calls its eDriver. eDriver in turn recursively calls eRM to allocate resources for its children from the resources it received from its parent eNode (Step 595).

For example, turning to FIG. 2 and FIG. 6, in step 590 root bus 410, eDriver calls eRM to allocate resources for the root bus eNode. eRM preferably allocates resources to root bus 410 and calls the root bus eDriver 451. The root bus eDriver 451 preferably allocates the resources to eNode IOH 420 and 430, respectively, depending on the resource requirements of each respective eNode. IOH 420 allocates its resources to ICH hub 426, PCI-PCI bridge bus 422, VxB bus 424, PCI device 421, IDE controller 427, and USB controller 428. PCI-PCI bridge bus 422 allocates its resources to SCSI devices 425 and 423. Next, IOH 430 allocates its resources to ICH hub 432, PCI device 431, FWH 436 and USB controller 434.

Referring now to FIG. 7, there is disclosed a high level code representation of the resource data structure according to the preferred embodiment of the present invention.

Upon all devices being allocated resources, in step 595, eDriver preferably returns control to eRM. eRM preferably returns control back to eDIM. eDIM preferably passes control back to POST. At the end of the above flow, eDIM has allocated resources for all devices found in the system.

Summary of Process 500 eDIM gets control from the POST.

The following are the steps involved in eDIM enumeration process:

AMIBIOS POST does the necessary initialization so that eDIM can see the root bus and its children. POST calls GlobalBusInit in eDIM.

Step 510. eDIM preferably finds and unpacks all the eDrivers found in the system firmware and builds a global list of eDrivers called eList.

Step 520. eDIM preferably initializes eCM by calling its respective init calls.

Step 530. eDIM preferably initializes eRM by calling its respective init calls.

Step 540. eDIM preferably allocates and fills the root eNode D0 450 and fills in data structure with generic information for data structure.

Step 550. eDIM preferably searches the eList to find the root bus driver 451 by searching for the driver for bus number zero.

Step 560. eCM preferably gives control to PrepareEnumeration entry point in the root bus eDriver. This call preferably prepares the root bus chipset registers for enumeration and also updates the eNode device object.

Step 570. eCM preferably calls Enumerate entry point in the root bus eDriver. This call will recursively enumerate and update resource requirement of the root bus and each eNode coupled to the root bus. When the control returns from this call, the whole eNode tree for the system will be built as shown in FIG. 5, wherein the D0, eDriver and communication pipes for each device in the computer system of FIG. 2 is enumerated.

Step 590. eCM preferably calls eRM to allocate resource for the root bus. This is done by calling eRMAllocateResource with eNode D0 as the parameter. eRM allocates the resources for the eNode and calls eDrivers AllocateResource entry point with allocated resource list. eDriver in turn recursively calls eRM to allocate resource for its children from the resources it got from eRM.

eDriver preferably returns call to eRM. eRM preferably returns control back to eCM. eCM preferably returns back to eDIM. eDIM preferably hands control back to POST.

Modularity and Scalability eDIM in a preferred embodiment is designed to support modularity and scalability of the BIOS by separating each bus and device handling means into an independent module, which allows for the re-architecture, addition or deletion of a module corresponding to the addition or removal of support for a particular bus, device or technology without affecting the other modules. A BIOS with a modular design allows for support of existing and evolving architectures such as IA64 and IA32 platform architectures. Modular design allows for support of both legacy free and legacy platform architectures. Legacy preferably refers to previous buses and or devices. If the BIOS code is legacy free then it does not have to support previous buses and or devices allowing for the BIOS code to be reduced in size and improving boot up reliability and runtime. In addition, the modular design allows down scaling of the BIOS for a particular system design or known embedded system. Extracting a subset of BIOS code from the modular general BIOS code reduces the BIOS size and improves boot reliability and runtime. Both legacy free and down scaling preferably benefit from the modular designs ability to eliminate the need to rewrite and debug code line-by-line when adding or removing support for a bus and or device.

Efficient Resource Management and Example

The amount of memory and I/O space available in a computer system is proportional to the number of buses and devices supported. As the number of buses and devices increases, memory resources become less abundant resulting in the need for an efficient use of existing memory resources. Resources such as memory & I/O space are limited based on the computer system's resources. To support additional devices without loss of efficiency, it is crucial that the resource management scheme operate very efficiently by allocating the least amount of memory while still enabling operation.

The resources required by a device are dictated by the size and alignment the device requests, and consolidation of resources for each eNode. In older versions of BIOS products, the alignment & size resources requested was doubled and this wasted the amount of resources available by over allocation. eDIM avoids this problem by allocating correct memory and I/O space resource requirement.

Alignment is equivalent to round-off or boundary value. For example, if a computer system needs 4 MByte of memory with 4 Mbyte aligned then a valid addresses for 4 MByte of memory with 4 Mbyte aligned is 0x0, 0x400000, 0x1000000, etc., but not 0x4000 because it is not aligned on a 4 Mbyte boundary. Resource consolidation is where an eNode request resources based on parent resource requirements and the resource requirements of all child devices connect or pass up to the parent.

In Step 570 of FIG.4, each eNode and device is preferably required to report its resource requirements. eDrivers for each child device determine and report its resource requirements to its parent eNode. In the case of devices that are bridges (a device that connects two buses such as PCI-PCI bridge bus 422), the bridge device must consolidate all the resources of its children and determine the resource requirements to request of its parent eNode into a resource list. This phase requires some calculation by the eNode to determine the minimum resource requirements that the device must request while still being able to allocate the total eNode resources to all the other children of the eNode.

The calculation to determine the correct size for resource requirements is as follows:

if ($tTotal$ % $tAlignment$)[results in a remainder]
$tLength=tTotal+(tAlignment-(tTotal$ % $tAlignment))+tAlignment$;

else $tLength=tTotal$; [if evenly divided by $tAlignment$]

Where tTotal is the summation of all the resources for the children beneath that eNode tAlignment is the largest alignment value for a particular resource request tLength is the amount of resources the eNode will request from its parent eNode If tTotal is a multiple of tAlignment then eNode can request tTotal amount of resources, but if tTotal is not a multiple, then eNode can request the correctly aligned resources based on the formula above. Each eNode repeats this process with its children and passes the resource requirement to its parent eNode.

For example, in Step 570 of FIG.4, the resource calculation for Root Bus 410 is as preferably follows: PCI device 421 requests memory and I/O space resources of one 4 meg and one 8 meg; PCI-PCI bridge bus 422 has two children small computer system interfaces (SCSI) devices 423 and 425 respectively, where SCSI device 423 requests memory and I/O space resources of one 16 meg and one 64 meg and SCSI device 425 requests memory and I/O space resources of one 8 meg and one 64 meg; Virtual extended bus (VxB) 424 requests I/O space resources of one 64 meg. This example assumes that IOH 430 and its children and input/output controller hub (ICH) 426 and its children did not request any resources.

In this example, the eDriver for PCI-PCI bridge bus 422 calculates the proper size and allocation of resources for PCI-PCI bridge bus 422 and its children. Since bridges such as PCI-PCI bridge bus 422 do not require resources the calculation is as follows: tTotal equals 152 (64+64+16+8) meg, tAlignment equal 64, and tLength equals 240 meg (152+(64−40)+64). Next, the eDriver for IOH 420 calculates the proper size and allocation of resources for IOH and its children and such calculation is as follows: tTotal equals 316 (4+8+240+64) meg, tAlignment equal 64, and tLength equals 380 meg (316+(64−4)+64). In this example, IOH 430 did not request any resources and therefore, when Root Bus 410 calculates the proper size and allocation of resources for root bus 410, the resource requirement of IOH 420 is passed up to root bus 410 and becomes root bus 410 resource requirement.

In Step 590 of FIG.4, the parent eNode preferably distributes the requested or aligned resources to all the children of the eNode. Each tier in the system is allocated to and then the system moves on to the first child, repeating the process until all resources have been allocated in the parent eNode. To determine which resource request is allocated to first, eDIM 310 follows a method that uses a size sorted list of resource requests for all the children and a ratio calculation that determine the optimal fit of a specific resource request into the requested memory range.

The following is a description of the method. eDIM 310 preferably starts at the beginning of the resource list of the eNode comparing the ratio of allocation range size of the parent eNode to the size of the allocation range requested by the device or subsequent eNode and eDIM 310 preferably allocates resources first to the lowest ratio device or eNode, which is the largest allocation request. Allocation ranges are 0 to 1 Meg for legacy devices, 1 Meg to 4 gig for 32 bit devices, and 4 gig and up for 64 bit devices. For example, in reference to FIG. 4 a 32 bit standard computer system the ratio of eNodes for IOH 420 is as follows: PCI-PCI bridge bus 422 is (4 gig−1 meg)/240 meg, VxB bus 424 is (4 gig−1 meg)/64 meg, and PCI-PCI bridge bus 422 is (4 gig−1 meg)/12 meg, therefore, eDIM 310 will preferably allocate in the following order 240 meg of resources to PCI-PCI bridge bus 422, 64 meg of resources to VxB bus 424, and 12 meg of resources to PCI-PCI bridge bus 422. Further, PCI-PCI bridge bus 422 240 meg of resources will be further allocated between SCSI device 423 and SCSI device 425. The ratio is as follows: (4 gig−1 meg)/64 meg for I/O space resources for SCSI device 423, (4 gig−1 meg)/64 meg for I/O space resources for SCSI device 425, (4 gig−1 meg)/16 meg for memory resources for SCSI device 423, and (4 gig−1 meg)/8 meg for memory resources for SCSI device 425, therefore, eDIM 310 will allocate in the following order 64 meg for I/O space resources for SCSI device 423, 64 meg for I/O space resources for SCSI device 425, 16 meg for memory resources for SCSI device 423, and 8 meg for memory resources for SCSI device 425. Further, PCI device 421 12 meg of resources will be further allocated between memory and I/O space. The ratio is as follows: (4 gig−1 meg)/8 meg for I/O space resources for PCI device 421, and (4 gig−1 meg)/4 meg for memory resources for SCSI device 423 therefore, eDIM 310 preferably will allocate in the following order 8 meg for I/O space resources and 4 meg for memory resources for PCI device 421. If there is more than one eNode with the same ratio, then eDIM 310 will allocate resources to the first device or eNode found in the list. Note, when child is requesting resources the child can try to define the memory address range in which it will be allocated. This ratio should never drop below one. Since, the resource list is sorted by size the largest eNodes should be allocated resources before the smaller eNodes resulting in the most efficient use of resources.

Efficient Resource Management

For example, in Step 590 of FIG. 4, the resource allocation for Root Bus 410 is as follows. Root Bus 410 children requested 316 meg of memory and I/O space resources. Root bus 410 is coupled to IOH 420 and IOH 430. Since, in this example, IOH 430 and its children did not request any memory and I/O space resources the entire 316 meg of memory and I/O space resources is allocated to IOH 420. Since, the children of IOH 420 did not request a range as its resource allocation IOH 420 allocates memory and I/O space resources requirements by size. In this example PCI-PCI bridge bus 422 requested 152 meg of memory and I/O space resources or 152 meg of the 316 meg, therefore, PCI-PCI bridge bus 422 receives the top 152 meg of memory and I/O space resources from IOH 420. IOH 420 next looks to the resource list, which is ordered by size, for the next bus or device to allocate resources. Since VxB 424 requested 64 meg memory and I/O space resources or 64 meg of the 316 meg, VxB 424 receives the next 64 meg resources from IOH 420.

Since PCI device 421 requested 4 and 8 meg of memory and I/O space resources or 12 meg of the 316 meg, PCI device 421 receives the next 8 and the next 4 meg of resources from IOH 420. PCI-PCI bridge bus 422 is coupled to SCSI devices 423 and 425. SCSI devices 423 and SCSI devices 425 each requested 64 meg of I/O space resources or 64 meg of the 152 meg. Since each requested the same ratio of resources the PCI-PCI bridge bus 422 allocates to the first device or bus in the resource list. Therefore, PCI-PCI bridge bus 422 allocates 64 meg of resources to SCSI devices 423 first since SCSI devices 423 is first in the resource list. Next, PCI-PCI bridge bus 422 allocates the next 64 meg of resources to SCSI devices 425. Since SCSI devices 423 requested 16 meg of memory space resources or 16 meg of the 152 meg, PCI-PCI bridge bus 422 allocates the next 16 meg to SCSI devices 423. Since SCSI devices 425 requested 8 meg of memory space resources or 8 meg of the 152 meg, PCI-PCI bridge bus 422 allocates its next 8 meg to SCSI devices 423. Finally, the VxB 424 bus protocol allocates resources.

eDIM can be configured with a customized set of eDrivers providing support for pre-configured or closed platform configuration. This pre-set resource allocation scheme allows the BIOS to support pre-configured or closed systems where there is no need for device enumeration and resource allocation in every boot.

Option ROM

Option ROMs preferably are programs that provide software functionality for a particular type of hardware or eNode. If an eNode has an option ROM then it has to make a special type of memory request. The rules of the architecture determine the method for allocating memory space that is needed for the option ROMs. In the current legacy computer systems, the architecture is PCI so all option ROMs must have memory space allocated to the device under 1 Meg, between the address spaces of 0xC0000-0xF0000.

The enumeration process, in step 570, works the same way that enumeration does for non-Option ROM memory requests. However, the allocation process is not performed during step 590, since the option ROMs require other functionality. Thus, the option ROMs are allocated resources by eDIM as a second entry through step 590 later when the system is ready to initialize the devices or eNodes. The reason for this is the option ROMs has an initialization size and a runtime size. The runtime size is less than or equal to the initialization size and so the system can free some or all of the memory allocated to the device for its Option ROM. Because of this unique shrinking of needed resource size, the resource allocation process can be more efficient because it will not be left with large gaps between the allocated spaces. During option ROM resource allocation, step 590 allocates resources for a specific option ROM, copies the vendor or original equipment manufacture code to the allocated resource area, and then passes control to the code. Upon return of control to eDIM, the resource allocation may have shrunk. eDIM adjusts the resource allocation for such option ROM and then moves on to allocate the next option ROM.

Bridge Hopping

At the early stages of the PC evolution, there were only a few different I/O bus types such as ISA, EISA, PCI, etc. In addition, most legacy computer systems operated using the same type of I/O bus, such as ISA. However, as computer systems have become increasingly more complicated these systems demand faster buses, such as PCI-X, PCI Express, Hyper Transport, InfiniBand, VxB, etc. Computer systems with new types of I/O buses need to support and maintain compatibility with legacy types of I/O buses. To do this, manufacturers included bridge devices that switch signals/data from one type of I/O bus architecture to another. This technique is called "Bridge Hopping". The resource requirement and resources supported for each I/O bus varies. For example, ISA bus includes features such as direct memory access (DMA) channel whereas PCI does not have such a feature or resource. This feature or resource requirement has to be properly handled by the configuration software. Regarding enumeration (step 580), the bridge device represented by its eNode must be able to locate the device within new architecture, such as a new I/O bus, and it must be able to understand and consolidate resource requests by its child eNodes and translate the resource requests to a form that the parent architecture can understand. Regarding allocation (step 590), the bridge device represented by its eNode must be able to translate the resource allocation and program its child devices according to said resource allocation.

Bridge hopping is a term used to describe the transition of a call from one bus architecture to a second and different bus architecture, such as from PCI bus to the VxB bus. To make this transition there must be a device between the two that is called a bridge. This bridge has the capability of translating and understanding calls on both I/O bus architectures. In eDIM, the bridge device preferably understands how to enumerate and allocate resources to the devices that exist beneath it as child nodes.

In addition, the bridge preferably can recognize a call coming from one I/O bus for access to one of the its child devices on another I/O bus as well as calls from one of its child eNodes back across its I/O bus through the bridge device and to a parent eNode on the other I/O bus by seamlessly converting the call from one bus architecture to another.

Debugging

The eDIM debugging and error logging system is preferably based on a level of severity. Different types of messages can be displayed in relation to the debugging index that is defined at compile time. The range of severity for displaying messages changes from no messages, debugging turned 'off', to informational messages, debugging turned 'on' and the debug level is set between level 0 to level 7. Examples of informational messaging include stating a device type has been found or the device tree has been fully enumerated. As the debug level increases, more information should become available to the user. eDIM preferably uses this system to collect system information and display that information. This can get as detailed as the value of variables and execution paths during testing.

eDIM preferably defines the different levels of debugging messages for an eNode as follows:

0-No debug information 1-3: Defines basic control flow information

4-Resource allocation information—i.e., what type of memory and I/O space resources are requested by the eNode 5-Mid level control flow information 6-Detailed control flow information 7-Highest level of debug information displayed—calculated values, function pointer addresses.

North Bridge and South Bridge Code Separation

Separation of north and south bridge code is preferably accomplished by grouping chipset functionality into specific eDrivers. This separation allows different eNodes to be supported by one eDriver. eDIM will still contain the generic eDrivers, but when an eNode is detected within the South Bridge then the Report Confidence of the South Bridge eDriver will return high and eDIM has classified a bus specific driver. The North Bridge has the same functionality.

In addition, separation of north and south bridge code preferably allows the system engineer to support new eNodes and systems. By separating the north and south bridge code the eDIM provides modularity in that if the system has a new north bridge and the same south bridge, then the same south bridge eDriver continues to be used. The new north bridge requires a new eDriver to be created.

Hot Plugging Support

The eDriver that supports hot plugging will provide a callback function that will support the needed hot plugging functions. Before a card can be hot plugged, the system must be notified that hot plugging support is needed. Hot plugging support causes a series of function calls that eDIM will initiate, including calling the hot plug eDriver and providing the services necessary to complete the hot plugging operation.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A method of initializing BIOS (basic input/output system) POST (power on self test) of a device within a computer system, said method comprising the step of:
    during BIOS POST, calling a modularized enhanced device initialization manager (eDIM) to perform a set of BIOS initialization instructions and to build a driver list for the devices of the system, the driver list comprising types and characteristics of each available driver; and
    upon the eDIM performing the set of BIOS initialization instructions and building the driver list, returning control from the eDIM back to the BIOS POST.

2. The method of claim 1, wherein said eDIM further comprises the step of classifying each driver into a group consisting of device/bus specific, class specific, or generic driver classification.

3. The method of claim 1, wherein said eDIM further comprises the step of initializing a configuration manager that provides generic instructions for enumerating and allocating a device tree during POST.

4. The method of claim 1, wherein said eDIM further comprises the step of initializing a resource manager that manages system-wide resources and manages arbitration and allocation of the resources to buses and devices of the system during POST.

5. The method of claim 1, wherein said eDIM further comprises the step of allocating a root bus.

6. The method of claim 1, wherein said eDIM further comprises the step of locating a driver for root bus in said driver list.

7. The method of claim 1, wherein said eDIM further comprises the step of preparing entry points for said root bus.

8. The method of claim 1, wherein said eDIM further comprises the step of enumerating said root bus.

9. The method of claim 1, wherein said eDIM further comprises the step of allocating resources to said root bus.

10. A method of performing a modularized set of BIOS initialization instruction of a device within a computer system, said method comprising the steps of:
    a) during POST, building a driver list for a device of a system, the driver list comprising types and characteristics of each available driver;
    b) initializing a configuration manager that provides generic instructions for enumerating and allocating a device tree during POST;
    c) initializing a resource manager that manages system-wide resources and manages arbitration and allocation of the resources to buses and devices of the system during POST;
    d) allocating a root bus through the configuration manager;
    e) upon allocating the root bus, locating a driver for said root bus in said driver list through the configuration manager;
    f) upon locating the driver, preparing the entry points of said root bus through the configuration manager;
    g) upon preparing the entry points, enumerating said root bus through the configuration manager; and
    h) upon enumerating said root bus, allocating resources to said root bus through the resource manager.

11. The method of claim 10, wherein said step of enumerating said root bus further comprises the step of recursively enumerating each eNode coupled to said root bus.

12. The method of claim 10, wherein each step of allocating resources to said root bus further comprises the step of recursively allocating resources to each eNode coupled to said root bus.

13. A computer system comprising:
    a) a central processing unit (CPU) having registers associated therewith and functioning for executing a basic input/output system (BIOS);
    b) a read-only memory (ROM) in circuit communication with said CPU and containing BIOS code executable on said CPU;
    c) a random access memory (RAM) in circuit communication with said CPU, wherein said CPU, ROM, RAM and BIOS being configured to:
    during POST, build a driver list for a device of a said system, the driver list comprising types and characteristics of each available driver;
    initialize a configuration manager that provides generic instructions for enumerating and allocating a device tree during POST;
    initialize a resource manager that manages system-wide resources and manages arbitration and allocation of the resources to buses and devices of the system during POST;
    allocate a root bus through the configuration manager;
    locate a driver for said root bus in said driver list through the configuration manager;
    prepare the entry points of said root bus through the configuration manager;
    enumerate said root bus through the configuration manager; and
    allocate resources to said root bus through the resource manager.

14. A computer system according to claim 13 further comprising isolated code sections that perform specific functions.

15. A computer system according to claim 13 further comprising subroutines that support specific hardware devices.

16. A computer system according to claim 13 further comprising support for IA64 and IA32 platform architectures.

17. A computer system according to claim 13 further comprising support for full BIOS modularity facilitating the removal or addition of support for a device.

18. A computer system according to claim 13 further comprising support for legacy free and legacy platform architecture.

19. A computer system according to claim 13 further comprising support bridge hopping.

20. A computer system according to claim 13 further comprising support option ROMs.

21. A computer system according to claim 13 further comprising support for separate north and south bridge code.

22. A computer system according to claim 13 further comprising resource and error logging.

* * * * *